US008649799B2

(12) United States Patent
Noldus et al.

(10) Patent No.: US 8,649,799 B2
(45) Date of Patent: Feb. 11, 2014

(54) UNLICENSED MOBILE ACCESS (UMA) TERMINAL LOCATION IN A COMMUNICATIONS NETWORK

(75) Inventors: Rogier Noldus, Goirle (NL); Jos den Hartog, Capelle A/d Ijssel (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 359 days.

(21) Appl. No.: 12/668,260

(22) PCT Filed: Jun. 9, 2007

(86) PCT No.: PCT/EP2007/056996
§ 371 (c)(1),
(2), (4) Date: Jan. 25, 2010

(87) PCT Pub. No.: WO2009/006940
PCT Pub. Date: Jan. 15, 2009

(65) Prior Publication Data
US 2010/0203898 A1    Aug. 12, 2010

(51) Int. Cl.
*H04W 24/00*    (2009.01)
(52) U.S. Cl.
USPC .......... 455/456.1; 370/310; 370/328; 709/202
(58) Field of Classification Search
USPC .............. 455/456.1; 370/328, 310; 709/202
See application file for complete search history.

(56) References Cited

U.S. PATENT DOCUMENTS

| | | | |
|---|---|---|---|
| 7,542,455 B2 * | 6/2009 | Grayson et al. | 370/338 |
| 7,640,008 B2 * | 12/2009 | Gallagher et al. | 455/414.1 |
| 7,664,495 B1 * | 2/2010 | Bonner et al. | 455/433 |
| 7,864,673 B2 * | 1/2011 | Bonner | 370/230 |
| 2006/0172732 A1 * | 8/2006 | Nylander et al. | 455/433 |
| 2007/0008885 A1 | 1/2007 | Bonner | |
| 2009/0016274 A1 * | 1/2009 | Nylander et al. | 370/328 |

FOREIGN PATENT DOCUMENTS

| | | |
|---|---|---|
| WO | 2006/089567 A1 | 8/2006 |
| WO | 2006/117759 A1 | 11/2006 |
| WO | 2007015068 A1 | 2/2007 |
| WO | 2007/048028 A2 | 4/2007 |

OTHER PUBLICATIONS

Author Unknown. UMA Architecture (Stage 2) R1.0.2 (Nov. 2, 2004). Unlicensed Mobile Access (UMA); Architecture (Stage 2); Nov. 2004.
Telefonaktiebolaget L M Ericsson; NGRC 1.0 Technical Solution; 1551-FCP 103 6210 Uen, PB1; Jan. 25, 2006; pp. 1-30.

(Continued)

*Primary Examiner* — Amancio Gonzalez
(74) *Attorney, Agent, or Firm* — Coats and Bennett PLLC

(57) ABSTRACT

A method of managing location information of an Unlicensed Mobile Access terminal in a Global System for Mobile Communications network. An IP address of the terminal is received at a Generic Access Network Controller. The Generic Access Network Controller then sends a query to a Connectivity Session Location and Repository Function associated with the IP network or IP sub network through which the UMA terminal has gained IP connectivity for the purpose of attaching to a Mobile Switching Center or Serving General Packet Radio System Service Node. The Connectivity Session Location and Repository Function sends location information to the Generic Access Network Controller, which then transmits the location information to a Mobile Switching Center or a Serving General Packet Radio System Service Node.

8 Claims, 3 Drawing Sheets

(56) References Cited

OTHER PUBLICATIONS

Telefonaktiebolaget L M Ericsson; Next Generation Resource Control (NGRC) 1.1 Technical Product Description; Jan. 11, 2007; pp. 1-49; retrieved from internet on Jun. 21, 2013; at http://dc101.4shared.com:8080/doc/RbYLcDr8/preview.html (Only has pp. 1-11 on internet), full copy enclosed.

Telefonaktiebolaget L M Ericsson; Network Resource Control in a Multi-Access Environment; T-Com; May 25, 2006; pp. 1-53.

Telefonaktiebolaget L M Ericsson; Next Generation Resource Control CLF-NACF 1.1 Interface Description; 1/155 19-HSC 901 79 Uen PA1, Aug. 30, 2006; pp. 1-34.

Telefonaktiebolaget L M Ericsson; Next Generation Resource Control CLF-SBC 1.1 Interface Description; 2/155 19-HSC 901 79 Uen PA1; Dec. 20, 2006; pp. 1-30.

* cited by examiner

UNLICENSED MOBILE ACCESS (UMA) TERMINAL LOCATION IN A COMMUNICATIONS NETWORK

TECHNICAL FIELD

The invention relates to the field of terminal location in a communications network, and in particular in a Global System for Mobile Communications network.

BACKGROUND

The Global System for Mobile communications (GSM) is a commonly used standard for mobile telephony. A GSM subscriber can connect to a GSM network using her terminal via a Mobile Switching Centre Server (MSC), which provides circuit switched calling, packet switched services, mobility management and other GSM services to the user terminal.

When a GSM subscriber attaches to a MSC, a Base Station Controller (BSC) in the radio access network reports the cell in which the subscriber resides to the MSC. The BSC also reports the current cell to the MSC when, for example, the subscriber's mobile station performs a periodic location update procedure, when the subscriber initiates a GSM service, and when the subscriber changes position to another location area. The MSC may use internal mapping to associate a location identifier (or location number) with the subscriber's current cell. The location number indicates the physical or geographic location of the subscriber, and can be used by the MSC and by Value Added Services (VAS). Examples of VAS that use the subscriber's location for service logic processing include Home zone, Office zone and Location based charging. Often, a Public Land Mobile Network (PLMN) operator uses E.164 numbers as the location numbers. Where this is done, the operator defines a number plan for its radio access network, and each location area within this radio access network has a location number associated with it. A location area may be a single GSM cell or a group of cells, as defined by the operator. A location number is similar to a fixed network number. For example, a Public Switched Telephone Network (PSTN) number can be used to identify, to some extent, the subscriber's location. Generic Access Network (GAN) allows GSM subscribers to gain access to a GSM network using unlicensed spectrum, such as Wireless LAN and Bluetooth. GAN is the formal term used by 3GPP; but this technology is more commonly known under the name Unlicensed Mobile Access (UMA). The term UMA is used in the remainder of the present document, and can be taken to refer to either Unlicensed Mobile Access or Generic Access Network. Access to a GSM network using UMA is normally done using a terminal supporting both regular GSM access and UMA access. Such a terminal is referred to herein as a UMA terminal. UMA allows a subscriber having a UMA terminal to perform a handover between GSM access and WLAN access, both during a call and outside a call.

When a GSM subscriber attaches to a GSM network using a UMA terminal, there is at present no defined mechanism for the MSC to associate a location number to the current location of the subscriber. This is because a Generic Access Network Controller (GANC), acting as a BSC, does not report a 'cell' to the MSC, related to the subscriber's current access, and so the MSC cannot use its regular method to derive a location number.

A UMA subscriber may access a GSM network through a home WLAN access point, connected to a Digital Subscriber Line (DSL). The DSL connection provides IP connectivity. The UMA terminal, in turn, uses the IP connectivity to register with the GANC, which then registers the subscriber with the MSC. In the case where a subscriber uses UMA to access a GSM network through DSL, it would be desirable to be able to assign the DSL line number as the location number for that subscriber. For example, when the subscriber uses UMA to access a GSM network via DSL, her location could be determined by the DSL line identity. Similarly, when a subscriber uses UMA through a Wireless Local Area Network (WLAN) access at home, and that subscriber's PSTN number at home is +46 26 157000, then her location number for the purpose of UMA access would be +46 26 157000.

When a service such as Virtual Private Network (VPN) is controlling a call to or from that subscriber, the VPN service could receive the current location number of that subscriber. If the reported location number is, for example, +46 26 157000, then the VPN would be aware that the subscriber is connected to the network using her home WLAN/DSL, provided that the VPN can deduce from the reported location number (+46 26 157000) that the subscriber's current location is served by a GANC. It will be described below how a location number is associated with a GANC.

Having a location number available when using UMA access is required for emergency calls. Operators are forced by law to provide the location of a calling subscriber when the subscriber establishes an emergency call. Furthermore, Lawful Intercept (LI) systems often need to be able to determine a calling person's or called person's location. A solution to this problem is provided by WO 2007/048028, although this involves communicating with a Serving Mobile Location Centre. The SMLC must send a positioning request to a database and calculate the location using the received information. This requires bandwidth and processor use for each location request. Another solution in the context of an IP Multimedia Subsystem (IMS) network is to query a Connectivity Session Location and Repository Function (CLF) using a Media Access Control (MAC) address of an access point. However, the MAC address can be easily changed and so the MAC address cannot be associated with location information with any certainty.

SUMMARY

The invention provides a mechanism to make a location number, such as a PSTN DSL line number, available to the GSM network when a subscriber attaches to a GSM network through UMA.

According to a first aspect of the present invention, there is provided a method of managing location information of an Unlicensed Mobile Access terminal in a Global System for Mobile Communications network. A Generic Access Network Controller receives an IP address of the terminal, and then sends a query to a Connectivity Session Location and Repository Function associated with the IP network or IP sub network through which the UMA terminal has gained IP connectivity for the purpose of attaching to a Mobile Switching Centre. The Connectivity Session Location and Repository Function returns location information to the Generic Access Network Controller in response to the query. The Generic Access Network Controller then transmits the location information from the Generic Access Network Controller to a communications service node, the communications service node being selected from one of a Mobile Switching Centre, MSC, and a Serving General Packet Radio System Service Node, SGSN.

The location information may be transmitted from the Generic Access Network Controller to the communications service node using an enhanced GSM Attach procedure.

Alternatively, a request from the communications service node for location information may be received before transmitting the location information from the Generic Access Network Controller to the communications service node. In response to the request, the location information is transmitted from the Generic Access Network Controller to the communications service node. In this way the communications service node may specifically request the location information if it is required.

Before making the request, the communications service node may determine a Location Area Code and a Cell Identifier from a Cell Global Identifier that is reported from the Generic Access Network Controller. The Location Area Code or the combination of the Location Area Code and Cell Identifier indicates whether the terminal is connected via a Generic Access Network Controller. As a result of the determination, the request for location information is sent from the communications service node to the Generic Access Network Controller.

Alternatively, where UMA access is used to replace W-CDMA radio access, and before making the request, the communications service node may determine a Location Area Code and a Service Area Code from a Cell Global Identifier that is reported from the Generic Access Network Controller. The Location Area Code or the combination of the Location Area Code and the Service Area Code indicates whether the terminal is connected via the Generic Access Network Controller. As a result of the determination, the request for location information is sent from the communications service node to the Generic Access Network Controller.

The location information may comprise an E.164 Public Switched Telephone Network number. Alternatively, the location information may be selected from any of a virtual line identity, a postal code, geographic information, geodetic information and location information identifying a Wireless Local Area Network Access Point.

According to a second aspect of the invention there is provided a Generic Access Network Controller for use in a Global System for Mobile Communications network. The Generic Access Network Controller comprises a receiver for receiving an IP address of an Unlicensed Mobile Access terminal, a processor for generating a query message, and a transmitter for transmitting the query message to a Connectivity Session Location and Repository Function associated with the terminal. The receiver is adapted to receive a response message in response to the query, the response message comprising location information. Furthermore, the transmitter is adapted to send a message containing location information to a node selected from a Mobile Switching Centre and a Serving General Packet Radio System Service Node.

The Generic Access Network Controller may comprise a memory for storing the location information, thereby maintaining a record of the location information.

The message containing location information to be sent to the Mobile Switching Centre or Serving General Packet Radio System Service Node may be selected from a Direct Transfer Application Part message, a Base Station System Application Part (BSSAP) message, a Radio Access Network Application Part (RANAP) message, a SOAP/XML message and an LDAP message.

According to a third aspect of the invention, there is provided a Mobile Switching Centre for use in a Global System for Mobile Communications network. The Mobile Switching Centre comprises a receiver for receiving from a node in an access network a message containing location information of a served subscriber attached to the Mobile Switching Centre, the location information relating to an Unlicensed Mobile Access terminal.

The Mobile Switching Centre may comprise means for, prior to receiving the message containing location information, determining from a reported Cell Global Identifier, a Location Area Code and a Cell Identifier. The Location Area Code or the combination of the Location Area Code and Cell Identifier indicates that the terminal is connected via a Generic Access Network Controller. A transmitter is also provided for, as a result of the determination, transmitting a request for location information to the Generic Access Network Controller.

According to a fourth aspect of the invention, there is provided a Serving General Packet Radio System Service Node for use in a Global System for Mobile Communications network. The Serving General Packet Radio System Service Node comprises a receiver for receiving from a node in an access network a message containing location information of a served subscriber attached to the Serving General Packet Radio System Service Node, the location information relating to an Unlicensed Mobile Access terminal.

Preferably, the Serving General Packet Radio System Service Node comprises means for, prior to receiving the message containing location information, determining from a reported Cell Global Identifier, a Location Area Code and a Cell Identifier. The Location Area Code or the combination of the Location Area Code and Cell Identifier indicates that the terminal is connected via a Generic Access Network Controller. A transmitter is also provided for, as a result of the determination, transmitting a request for location information to the Generic Access Network Controller.

DETAILED DESCRIPTION

Figure 1:
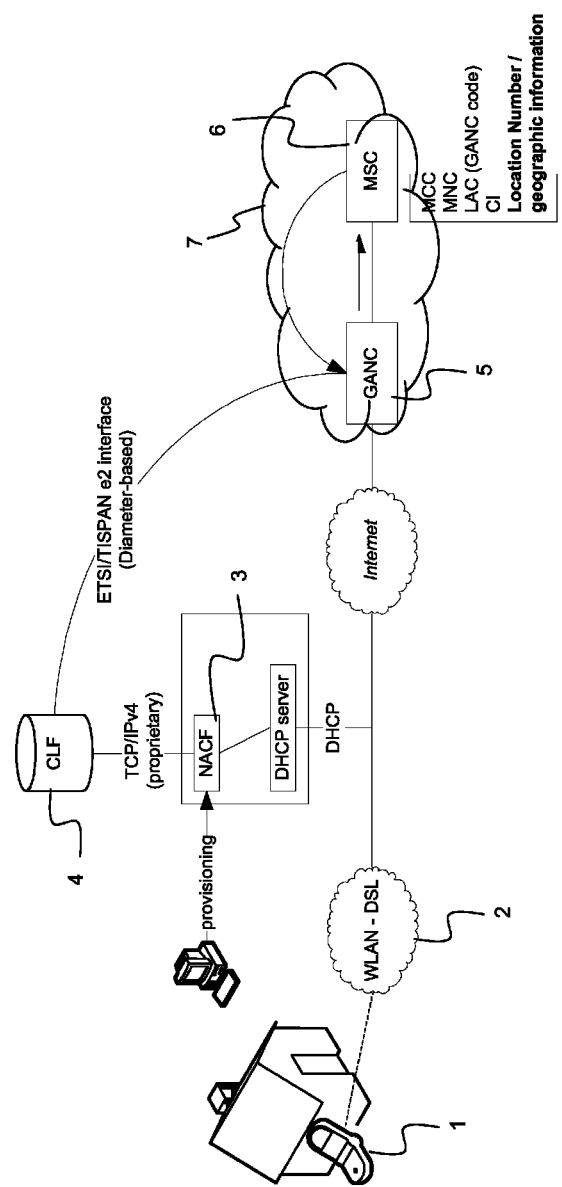
FIG. 1 illustrates schematically the architecture required for the invention.

Referring to FIG. 1, there is shown a UMA terminal 1 connecting to a DSL access network 2. A Network Access Configuration Function (NACF) 3, typically located in an IP access provider's network, is used to allocate an IP address to the UMA terminal 1. A Connectivity session Location and repository Function (CLF) 4, also typically located in the IP access provider's network, is also illustrated, which can communicate with the NACF 3 and with a Generic Access Network Controller (GANC) 5. The GANC 5 can in turn communicate with a Mobile Switching Centre (MSC) 6 in a GSM network 7 or communicate with a Serving General Packet Radio System Service Node (not shown) in a GSM network 7.

Figure 2:
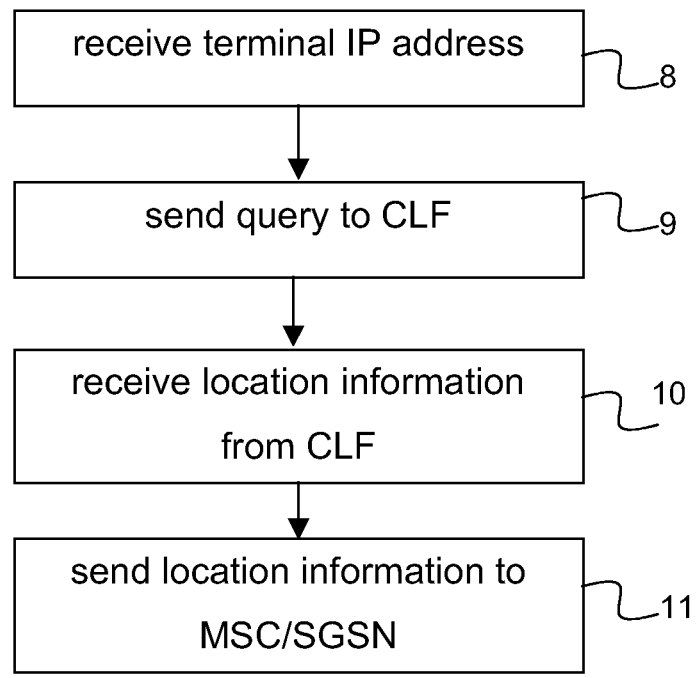
FIG. 2 is a flow diagram illustrating the steps of an embodiment of the invention.

When a subscriber with a UMA terminal 1 wishes to access a GSM network via a DSL network 2, the steps are as follows. Some of the steps are illustrated in FIG. 2.

1. An ADSL modem in the UMA subscriber's home obtains IP connectivity. It broadcasts a DHCP request to obtain an IP address. The DHCP request is received by a DHCP server of an IP subnet to which the subscriber's DSL line is connected. The connection of the DSL line to the public internet is via a DSL Access Multiplexer (DSLAM) (not shown in FIG. 1).

2. The DHCP server uses the service from an integrated or nearby NACF 3 to obtain an IP address, which is assigned to the DSL line.

3. The NACF 3 is provisioned with location related information for the DSL line from the DSL operator. This location related information may, for example, be the PSTN number of the DSL line. Alternatively, as described below, the CLF may be provisioned with this information.

4. The NACF 3 pairs the IP address allocated to the DSL line with the location related information (PSTN number or virtual line identity). The NACF 3 reports a Line identity to the CLF 4. The CLF 4 is provisioned with a corresponding Location Number for that Line identity, depending on operator requirements.

5. The NACF 3 reports the IP address and location information to the CLF 4. This may be reported using a suitable IP based protocol. In the case where the CLF 4 receives only a DSL line identity from the NACF 3, the CLF uses internally stored location information to associate a location number with the received IP address. The location number that is stored in the CLF and that is associated with a DSL line identity, is provisioned in the CLF through administrative means. The CLF 4 may also have been provisioned with geographic location information for this DSL line identity. The CLF then maintains the association between the IP address and the location information.

6. The UMA terminal 1 uses the IP connectivity from a WLAN access point in her house to attach as a UMA subscriber to a MSC 6 in the GSM network 7. The UMA terminal 1 establishes an IP tunnel with the GANC 5. The establishment of the IP tunnel is done in accordance with the UMA specifications.

7. As illustrated in FIG. 2, the GANC 5 receives 8, as part of establishing the IP tunnel, the IP address of the UMA terminal 1. The GANC 5 uses this IP address to query 9 the CLF 4. If the DSL access is operated by a different operator to the operator of the GSM network 7, including the GANC 5, then the IP address of the UMA terminal 1 is used to derive the address of the CLF 4. Agreements between DSL providers and the GSM operator are in place, allowing the GANC 5 to query the CLF 4 of the respective DSL operators. In response to the query, the GANC 5 obtains 10 the location information that is associated with this IP address. The present invention introduces an interface between the GANC 5 and the CLF 4. This interface has similar characteristics to the interface between a Session border gateway (SBG) and a CLF, and is commonly used.

From this point onwards, the GANC 5 retains the location information of the UMA terminal 1. The UMA terminal 1 uses the established IP tunnel to exchange Direct Transfer Application Part (DTAP) messages with the MSC 6 and to transport media to/from a Media Gateway, sending the media through the GANC 5.

The MSC 6 can then obtain 10 the location information from the GANC 5. This can be done in several ways, and two examples are described in steps 8a and 8b below:

8a. In one embodiment of the invention, the GANC 5 enhances the Attach message that is sent from the UMA terminal 1 to the MSC 6. The GANC 5 includes the location information in an Attach message. In this manner, the MSC 6 receives the location information (such as the location number) directly during the Attach procedure. This method allows for efficient transport of location information. Enhancing the radio information, in the information flow from a BSC (not shown) to the MSC 6, is already known, for example a feature can be implemented in the BSC to include "Radio report" in the DTAP signalling to the MSC 6 when a GSM subscriber establishes a communication channel with the MSC 6. The Location Number (or other location information obtained from CLF 4) can be included in this information flow.

8b. In an alternative embodiment of the invention, the GANC 5 does not enhance the Attach message. Instead, the MSC 6 behaves as follows: An MSC currently includes a software procedure to derive a location number from a Cell Global Identifier (CGI) that a Mobile station (MS) has previously reported to the MSC during an attach procedure, or during a Location update procedure. According to this embodiment, the software procedure is enhanced. The CGI includes a Mobile Country Code (MCC), Mobile Network Code (MNC), a Location Area Code (LAC) and a Cell Identifier (CI). The LAC is associated with a Location area; a Location area is defined by the part of the Radio access network that is served by a number (typically one) of BSCs. A GANC acts as a BSC towards the MSC and therefore has a LAC assigned to it. When a UMA subscriber attaches to the MSC, the LAC value contained in the CGI that the MS reports to the MSC, is associated with the GANC 5. The value of LAC may therefore indicate whether the subscriber is attached to the MSC via a BSC or via a GANC. Where a combined GANC-BSC is used, then that combined control node uses distinctive LAC values to indicate the mode of access. Alternatively, a combined GANC-BSC has a single LAC value assigned to it. In this case case, the CI value needs to be considered in combination with the LAC value to distinguish between UMA access and regular GSM access. The above-mentioned software procedure in the MSC deduces from the LAC that the subscriber is attached via a GANC 5, which triggers the MSC 6 to perform a query to the GANC 5 to obtain the subscriber's location information. The address of the GANC 5 to which the query shall be sent is provisioned in the MSC 6 (the MSC 6 and the GANC 5 belong to the same operator). If the operator's network contains multiple GANCs, then the address of the GANC 5 to which the query shall be sent is derived from the LAC that is reported from this GANC 5. The subscriber is identified in the query by her International Mobile Subscriber Identity (IMSI), as the GANC 5 has the IMSI of the subscriber available. The MSC 6 can decide whether it should retrieve the subscriber's location information. The MSC 6 may use LDAP, SOAP/XML or any other suitable protocol to retrieve the location information from the GANC 5.

Figure 3:
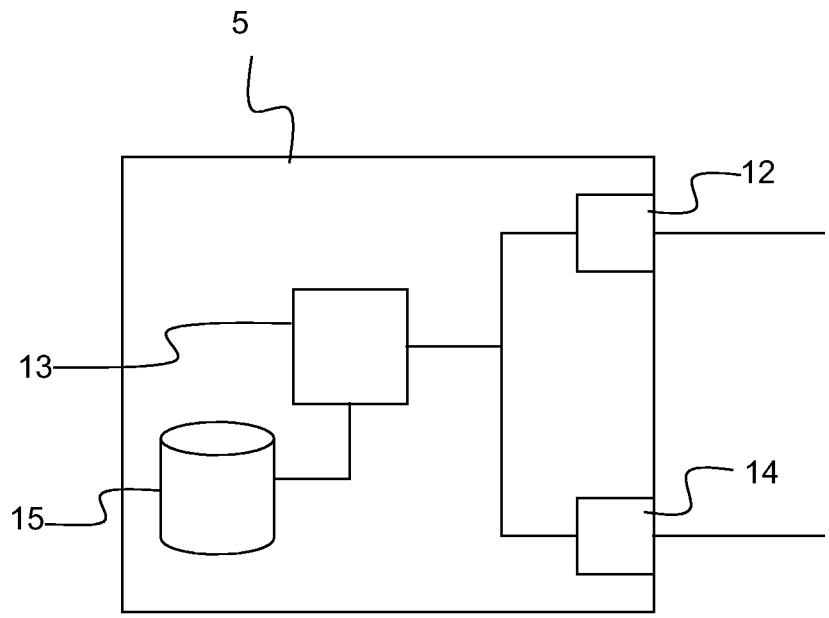
FIG. 3 illustrates schematically a Generic Access Network Controller according to an embodiment of the invention.

Referring to FIG. 3, a GANC 5 is illustrated. The GANC 5 includes a receiver 12 for receiving the IP address of the UMA terminal 1. A processor 13 is provided for generating a query message for sending to the CLF 4 in order to obtain location information. A transmitter 14 is also provided for sending the query message. The receiver 12 can also receive a response to the query message, the response containing the requested location information. This information may be stored in a memory 15 at the GANC 5.

Figure 4:
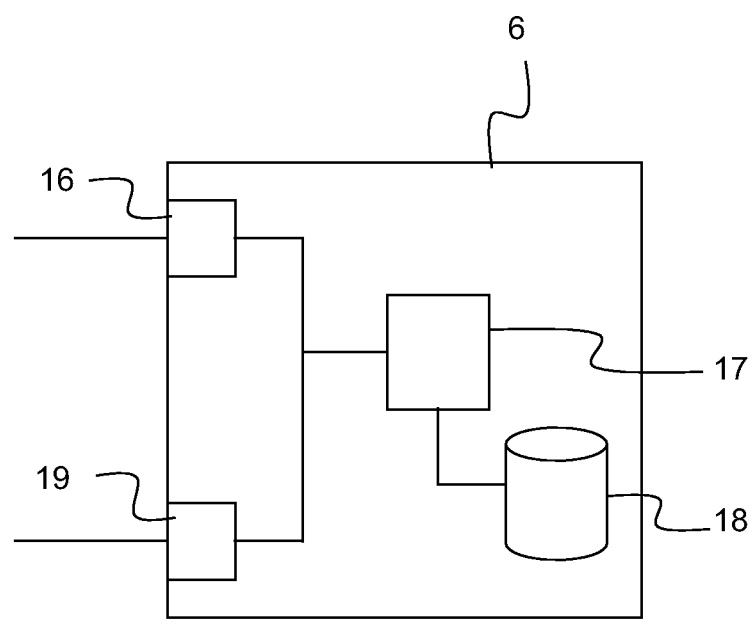
FIG. 4 illustrates schematically a Mobile Switching Centre according to an embodiment of the invention.

Referring to FIG. 4, a MSC 6 according to the embodiment in step 8b above is illustrated. The MSC 6 includes a receiver 16 for a message containing location information of the UMA terminal 1. A processor 17, a memory 18 and a transmitter 19 are also provided. For the embodiment described in step 8b above, the processor 17 and transmitter 19 are used to generate and send the message destined for the GANC requesting location information.

The above description describes the case in which a UMA terminal 1 attaches to the MSC 6 using a WLAN access point in her home. The WLAN access point is connected to a DSL, whereby the DSL is combined with a PSTN line. MSCs and VAS are used to associate a Location Number with a subscriber's position in the Radio access network. In this way a user's UMA terminal 1 is associated with her home location number when she connects to a GSM network 7 through her home WLAN access point.

It is possible for location information related to a UMA terminal to be provided to an MSC when that UMA terminal attaches to the MSC using UMA access other than the subscriber's home WLAN access point. In that case, a different location number will be reported to the MSC and hence, location based services (VAS) will detect that the subscriber is not in her home.

The invention may also be applied where the subscriber uses IP connectivity where there is no PSTN line associated with the IP connection, provided that another type of location information can be provided to the MSC. Examples of other types of access include public WLAN hot spots and a stand-alone DSL subscription, i.e. DSL subscription without having a PSTN subscription.

In these cases, there is no Location Number to be associated with the subscriber. In the case of a public WLAN, the WLAN access point through which the UMA terminal 1 accesses the GSM network 7, will still use a DHCP query to obtain an IP address. The operator of that WLAN access point may then provision the NACF or CLF with adequate location information for that WLAN access point. In such case, geographic information may be provisioned in NACF/CLF, or information such as a postal code may be provisioned in NACF/CLF. This information will then be reported to the GANC 5 when the GANC 5 queries the CLF, and will subsequently be reported to the MSC 6. Current MSCs have the capability to include in the Location information for a subscriber, information elements such as CGI, Location number and geographic information. If the MSC receives other type of location information from the GANC, such as postal code, then the MSC's internal structure needs to be enhanced.

The invention allows for a UMA terminal 1 to attach to an MSC 6, and the subscriber's location information such as a home PSTN number is reported to the MSC 6. This home PSTN number takes the place of Location Number. In this way, Location Based services and VAS can determine whether the UMA subscriber is residing in her home location or resides in another location.

When the UMA terminal 1 receives a call, Location information, including the location number, may be reported to a VAS function. A service like VPN may use this location number, indicating that the subscriber is in her home, using UMA, to apply a special tariff for the call (for example, in countries where terminating call charging applies).

The present invention offers a solution for emergency calls through a UMA. When a subscriber places an emergency call (e.g. '112', '911') through a UMA terminal, then the location number and geographic information of the subscriber will be available in the MSC and can be used for emergency call handling, such as routing the call to the nearest public safety answering point (PSAP).

The invention allows a GANC 5 to obtain location information related to a UMA terminal 1. The GANC obtains this information from the CLF 4 during GSM attachment. The CLF 4 contains the UMA terminal's location information, which may be, depending on operator requirement and configuration, an E.164 Location Number, geographic information ('geo coordinates'), a postal code or any other information that can locate the terminal.

The location information is included in the GSM Attach procedure from the GANC 5 to the MSC 6. Alternatively, the MSC 6 queries the GANC 5 to obtain the location information. The location information of the UMA terminal 1 that is received in this manner may be used for MSC-based location services, Value added services, emergency call and lawful intercept.

It will be appreciated by the person of skill in the art that various modifications may be made to the above described embodiments without departing from the scope of the present invention. For example, whilst the above description describes the invention as it applies to an MSC, it may alternatively be implemented using a Serving General Packet Radio System Service Node (SGSN) in the case where UMA access is used to replace a W-CDMA radio access network.

The invention claimed is:

1. A method of managing location information of an Unlicensed Mobile Access (UMA) terminal in a Global System for Mobile Communications (GSM) network, the method comprising:
   at a Generic Access Network Controller, receiving an Internet Protocol (IP) address of the UMA terminal through a secure IP tunnel that connects the Generic Access Network Controller to the terminal through a Digital Subscriber Line (DSL) wireless local area network (WLAN) connection, wherein the IP address is received after the UMA terminal has used the WLAN connection to gain IP connectivity for the purpose of attaching to a communications service node in the GSM network;
   sending a query from the Generic Access Network Controller to a Connectivity Session Location and Repository Function having stored location information for the WLAN connection, the query including the IP address of the UMA terminal;
   in response to the query, receiving the location information from the Connectivity Session Location and Repository Function, wherein the location information comprises an E.164 telephone number of the Digital Subscriber; and
   transmitting the location information from the Generic Access Network Controller to the communications service node in one of:
   a response to a request for location information received from the communications service node; and
   an enhanced GSM Attach message.

2. The method of claim 1, wherein the communications service node is selected from one of a Mobile Switching Centre (MSC) and a Serving General Packet Radio System Service Node (SGSN).

3. The method of claim 1, further comprising, in the event that location information is transmitted to the communications service node in response to a request for location information received from the communications service node:
   at the communications service node, determining from a reported Cell Global Identifier, a Location Area Code and a Cell Identifier, the Location Area Code or the combination of the Location Area Code and Cell Identifier indicating that the terminal is connected via the Generic Access Network Controller; and
   as a result of the determination, sending a request from the communications service node for location information to the Generic Access Network Controller.

4. The method of claim 1, further comprising, in the event that location information is transmitted to the communications service node in response to a request for location information received from the communications service node:
   at the communications service node, determining from a reported Cell Global Identifier, a Location Area Code and a Service Area Code, the Location Area Code or the combination of the Location Area Code and Service Area Code indicating that the terminal is connected via the Generic Access Network Controller; and as a result of the determination, sending a request from the communications service node for location information to the Generic Access Network Controller.

5. A Generic Access Network Controller for use in a Global System for Mobile Communications (GSM) network, the Generic Access Network Controller comprising:

a receiver configured to receive an Internet Protocol (IP) address of an Unlicensed Mobile Access (UMA) terminal that connects to the Generic Access Network Controller through a Digital Subscriber Line (DSL) wireless local area network (WLAN) connection;

a processor configured to generate a query message, the query message including the IP address of the UMA terminal; and a transmitter configured to transmit the query message to a Connectivity Session Location and Repository Function that has stored location information for the WLAN connection;

wherein the receiver is further configured to receive a response message in response to the query, the response message comprising location information that includes an E.164 telephone number of the Digital Subscriber Line; and wherein the transmitter is further configured to send a message containing location information to a node selected from a Mobile Switching Centre (MSC) and a Serving General Packet Radio System Service Node (SGSN) in one of a response to a request for location information and an enhanced GSM Attach message.

6. The Generic Access Network Controller of claim 5, wherein the message containing location information to be sent to one of the MSC or SGSN is selected from a Direct Transfer Application Part (DTAP) message, a Base Station System Application Part (BSSAP) message, a Radio Access Network Application Part (RANAP) message, a SOAP/XML message and an LDAP message.

7. A Mobile Switching Centre for use in a Global System for Mobile Communications (GSM) network, the Mobile Switching Centre comprising:

a processor for determining from a reported Cell Global Identifier, a Location Area Code and one of a Cell Identifier and a Service Area Code, that an Unlicensed Mobile Access terminal is connected via a Generic Access Network Controller;

a transmitter for transmitting a request for location information to the Generic Access Network Controller; and a receiver for receiving from the Generic Access Network Controller a message containing location information of a served subscriber attached to the Mobile Switching Centre through a Digital Subscriber Line (DSL) wireless local area network (WLAN) connection, the location information relating to the Unlicensed Mobile Access terminal, wherein the location information comprises an E.164 telephone number of the Digital Subscriber Line.

8. A Serving General Packet Radio System Service Node for use in a Global System for Mobile Communications (GSM) network, the Serving General Packet Radio System Service Node comprising:

a processor for determining from a reported Cell Global Identifier, a Location Area Code and one of a Cell Identifier and a Service Area Code, indicating that an Unlicensed Mobile Access terminal is connected via a Generic Access Network Controller;

a transmitter for transmitting a request for location information to the Generic Access Network Controller; and a receiver for receiving from the Generic Access Network Controller a message containing location information of a served subscriber attached to the Serving General Packet Radio System Service Node through a Digital Subscriber Line (DSL) wireless local area network (WLAN) connection, wherein the location information comprises an E.164 telephone number of the Digital Subscriber Line.

* * * * *

UNITED STATES PATENT AND TRADEMARK OFFICE
CERTIFICATE OF CORRECTION

| | | |
|---|---|---|
| PATENT NO. | : 8,649,799 B2 | Page 1 of 1 |
| APPLICATION NO. | : 12/668260 | |
| DATED | : February 11, 2014 | |
| INVENTOR(S) | : Noldus et al. | |

It is certified that error appears in the above-identified patent and that said Letters Patent is hereby corrected as shown below:

On the title page, item (22), under "PCT Filed", in Column 1, Line 1, delete "Jun 9, 2007" and insert -- Jul 9, 2007 --, therefor.

In the Specification

In Column 3, Lines 18-22, delete "Location Area Code.......Network Controller." and insert the same at Line 17, after "of the" as a continuation paragraph.

In Column 6, Line 29, delete "case case," and insert -- case, --, therefor.

In the Claims

In Column 8, Line 36, in Claim 1, delete "Digital Subscriber;" and insert -- Digital Subscriber Line; --, therefor.

Signed and Sealed this
Twenty-sixth Day of August, 2014

Michelle K. Lee
*Deputy Director of the United States Patent and Trademark Office*